United States Patent [19]
Mestres

[11] Patent Number: 5,738,147
[45] Date of Patent: Apr. 14, 1998

[54] MODULAR, CONDUIT-ENGAGING END-FRAME

[75] Inventor: James Mestres, Kirkland, Canada

[73] Assignee: Ipex Inc., Don Mills, Canada

[21] Appl. No.: 539,690

[22] Filed: Oct. 5, 1995

Related U.S. Application Data

[63] Continuation-in-part of Ser. No. 262,878, Aug. 11, 1994, abandoned.

[30] Foreign Application Priority Data

May 6, 1994 [CA] Canada ................................. 2123045

[51] Int. Cl.⁶ ............................................. F16L 39/00
[52] U.S. Cl. .......................... 138/112; 138/113; 138/117; 248/68.1; 285/137.1
[58] Field of Search ............................ 138/111, 112, 138/113, 116, 117; 248/68.1, 69; 285/137.1

[56] References Cited

U.S. PATENT DOCUMENTS

| | | |
|---|---|---|
| 262,499 | 8/1882 | Strohm . |
| 297,183 | 4/1884 | Shelbourne ........................ 285/137.1 |
| 376,562 | 1/1888 | Van Buren et al. ................. 285/137.1 |
| 379,408 | 3/1888 | Muckle, Jr. ......................... 138/157 |
| 2,404,531 | 7/1946 | Robertson ........................... 248/68.1 |
| 3,895,830 | 7/1975 | Madlem . |
| 4,199,070 | 4/1980 | Magnussen, Jr. . |
| 4,834,825 | 5/1989 | Adams et al. ...................... 138/112 |
| 4,842,227 | 6/1989 | Harrington et al. ................ 248/68.1 |
| 5,060,810 | 10/1991 | Jones . |
| 5,205,520 | 4/1993 | Walker ............................... 285/137.1 |
| 5,415,155 | 5/1995 | Cohen et al. ...................... 138/111 |
| 5,570,723 | 11/1996 | Hwang et al. ..................... 138/106 |

*Primary Examiner*—David Scherbel
*Assistant Examiner*—James F. Hook
*Attorney, Agent, or Firm*—Riches, McKenzie & Herbert

[57] ABSTRACT

This invention relates to a modular, conduit end-frame comprising at least one peripheral modular element and at least one intermediate modular element, and the peripheral and intermediate modular elements themselves. The conduit end-frame has utility in orienting the ends of conduit in a work area. Each of the modular elements has flanges extending from its ends. During the installation process, the modular elements are secured in place during the pouring of concrete, by nails or screws connecting the flanges to a wooden frame. The flanges are at a sufficiently safe distance from openings in the end-frame through which electrical cable, and sometimes live electrical cable, will pass.

26 Claims, 5 Drawing Sheets

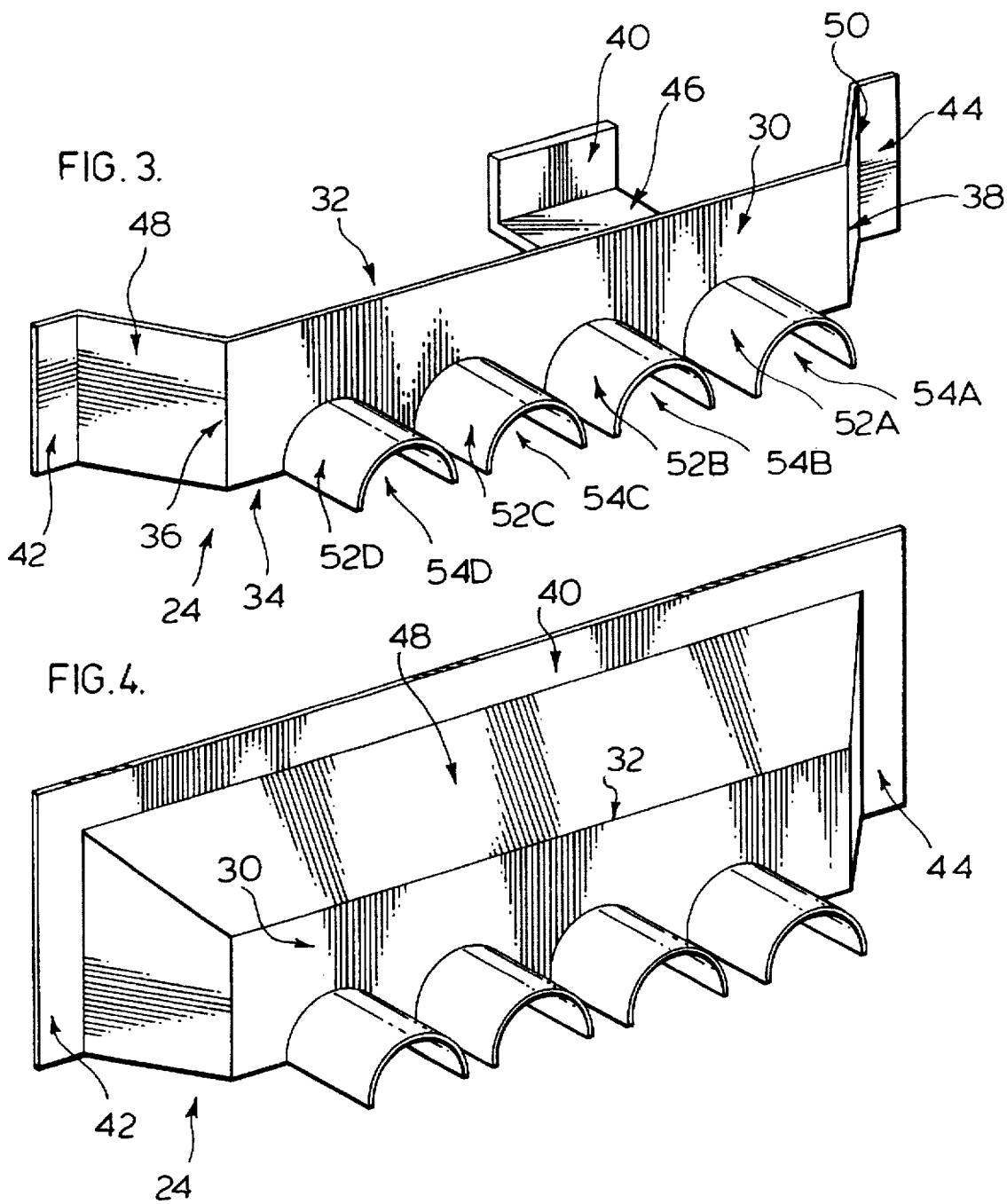

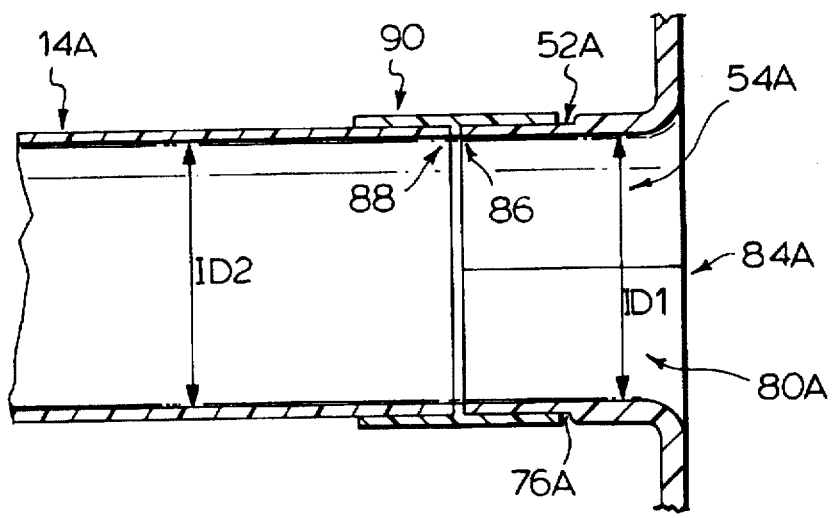
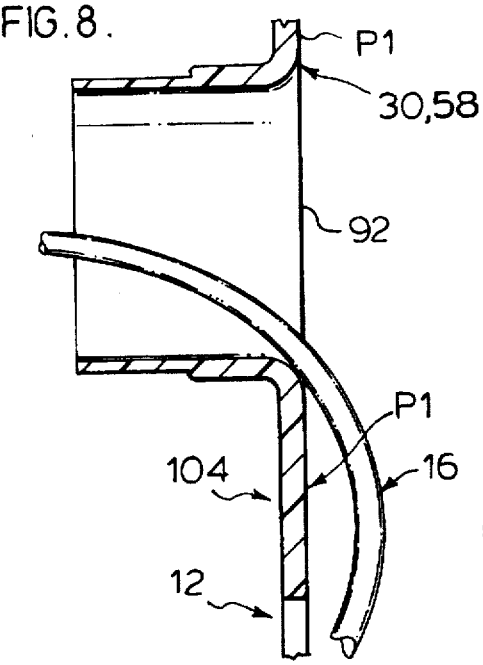
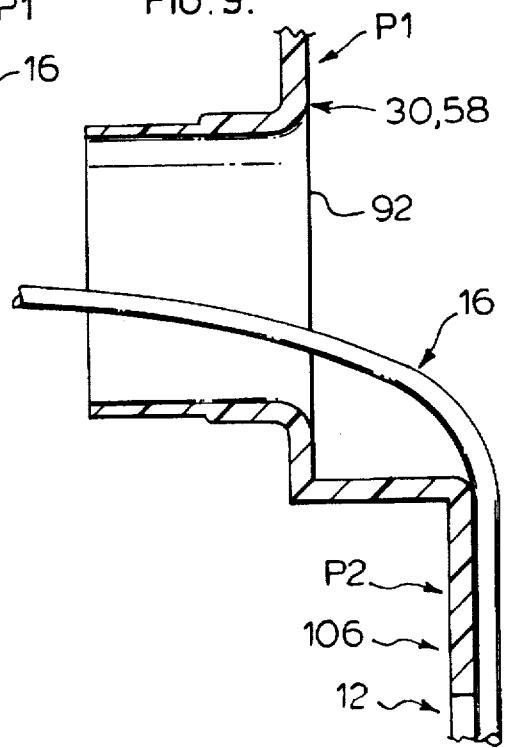

MODULAR, CONDUIT-ENGAGING END-FRAME

RELATED APPLICATIONS

This application is a continuation-in-part application from application Ser. No. 08/262,878, filed on Aug. 11, 1994, now abandoned.

BACKGROUND OF THE INVENTION

This invention relates to a modular, conduit end-frame and to the modular elements used to form the end-frame.

When electrical cable is laid underground, or in other applications, it is usually encased in some form of duct or conduit. Usually there are several conduits laid together. Usually the conduit is laid from one location to another. Usually the conduit will terminate as some type of underground work area. Typically, there will be several conduits, usually between 4 and 64 conduits, terminating at one area or wall of the underground work area. The cables within the conduit do not usually terminate in the work space area. Rather, the electrical cable continues into the work space area and into another conduit in another area of the work space or wall of the work space. Preferably, the conduits should be terminated on one wall in some sort of orderly fashion such as in a matrix where there are x rows of y conduits. Thus, there will be a matrix of x by y conduits.

The conduits terminating at the matrix are typically placed into position and then concrete, or some other type of fill such as sand, is poured about the conduit to keep the conduit in place.

When the concrete is being poured around the conduits, it is necessary to maintain the ends of the conduit in place. In the past, the ends of the conduit have been maintained in position by making a wooden frame having a grid-like appearance with wooden cross-pieces between the rows of conduits and wooden uprights between the columns of conduits. These wooden frames are time-consuming and expensive to manufacture. Also, the wooden frames can be dangerous and can lead to injury or death as a result of electrical shock if workers are not careful.

Because the cables in the conduits often make 90 degree turns in the underground workspace, it is preferred that some sort of rounded opening appear at the end of the conduit so that the cable is not damaged by rubbing against a sharp edge at the end of the conduit. In the past, in order to avoid sharp edges at the end of the conduits, workers would attach to the end of the conduit a "z-connector" which has a flared opening so as to avoid damage to the cable. These flared connectors were connected to the end of a conduit and individually nailed or screwed to the wooden frame.

Unfortunately, there have been occasions in the past where workers have inadvertently, during installation of the flared connectors and the wooden frame, hammered nails or screwed screws through the conduit and into live electrical cables—thus experiencing electrocution.

SUMMARY OF THE INVENTION

Accordingly, it is an object of this invention to at least partially overcome the disadvantages of the prior art by providing a modular end-frame for conduit. In particular, a modular end-frame that is easy to assemble and greatly reduces the likelihood of electrocution of workers is provided.

Accordingly, in one of its broad aspects, this invention resides in providing a modular, fill-flow-preventing, conduit-engaging end-frame, without conduit extending therefrom except for conduit that engages the end-frame as defined herein, comprising:

(a) a first peripheral modular element comprising:
   a substantially-rectangular, planar face member having first and second side edges and first and second end edges and having substantially no openings transversely therethrough except as defined below;
   at least one flange-like member extending outwardly from the first side edge of the face member and/or from each of the end edges of the face member, and wherein the flange-like member is not rearward of the face member;
   a plurality of substantially semi-circular, transverse openings through the face member and spaced along the second side edge of the face member; and
   a hollow, substantially semi-cylindrical member conforming in shape to and extending rearwardly from each semi-circular opening in the face member, and wherein each semi-circular member extends transversely from the face member; and (b) at least one intermediate modular element, wherein each intermediate modular element comprises:
   a substantially-rectangular, planar face member having first and second side edges and first and second end edges and having substantially no openings transversely therethrough except as defined below;
   a flange-like member extending outwardly from each of the first and second end edges of the face member of the intermediate modular element;
   a plurality of substantially semi-circular, transverse openings through the face member of the intermediate modular element and spaced along the first side edge of the face member of the intermediate modular element;
   a plurality of substantially semi-circular, transverse openings through the face member of the intermediate modular element and spaced along the second side edge of the face member of the intermediate modular element;
   a hollow, substantially semi-cylindrical member conforming in shape to and extending rearwardly from each semi-circular opening in the face member of the intermediate modular element, and wherein each semicircular member extends transversely from the face member of the intermediate modular element; and (c) a plurality of cylindrical, conduit-engaging members for engaging conduit, each having a conduit-sized inner diameter and each formed by a pair of opposed semi-cylindrical members of adjacent modular elements;
   wherein the face member of each modular element is aligned in a first plane;
   wherein the first side edge of a first of the at least one intermediate modular elements abuts against the second side edge of the first peripheral modular element;
   wherein each of the intermediate modular elements is aligned adjacently one to another such that the first side edge of a next intermediate modular element abuts against the second side edge of an adjacent intermediate modular element;
   wherein at least one of the flange-like members of each modular element has at least one portion through which a securing means may readily be passed; and
   wherein each flange-like member of each modular element is positioned parallel to or forward of a most forward opening in the face member of the respective modular element.

Further aspects of the invention reside in providing modular peripheral elements for the end-frame and modular intermediate elements for the end-frame.

Further aspects of the invention will become apparent upon reading the following detailed description and the drawings which illustrate the invention and preferred embodiments of the invention.

BRIEF DESCRIPTION OF THE DRAWINGS

In the drawings which illustrate preferred embodiments of the invention:

FIG. 3 is a preferred embodiment of a peripheral modular element;

FIG. 4 is another preferred embodiment of a modular peripheral element;

FIG. 7 is a partial cross-sectional view of a preferred embodiment of an element of the invention;

FIG. 8 is a partial cross-sectional view of an embodiment of an element of the invention;

FIG. 9 is a partial cross-sectional view of a preferred embodiment of an element of the invention;

DETAILED DESCRIPTION OF PREFERRED EMBODIMENTS OF THE INVENTION

Figure 1:
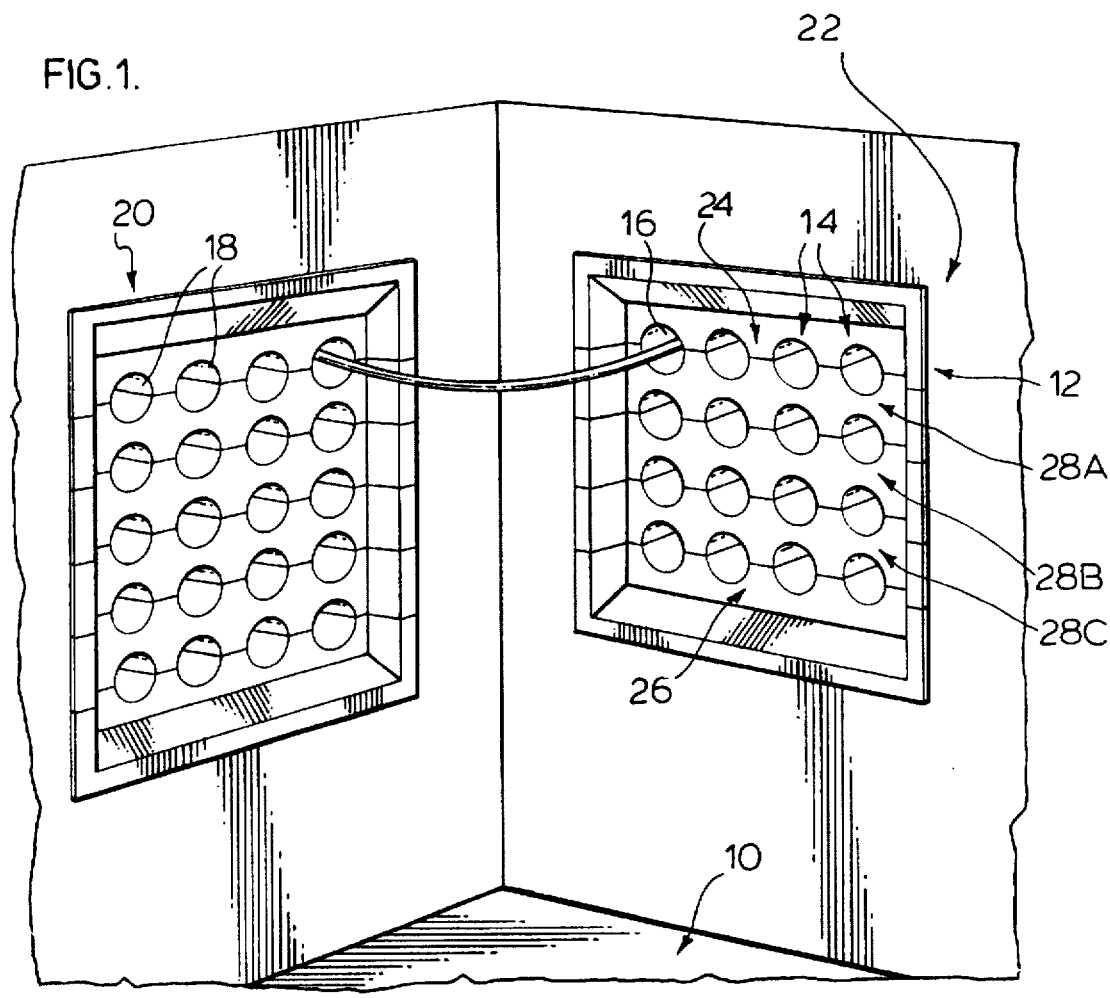
FIG. 1 is a perspective/schematic view of a work area where the end-frame of the invention is assembled.

Shown in FIG. 1, is a perspective/schematic view of a usual work area 10 for underground conduit and other applications. The work area is typically a room having a wall 12 at which a plurality of conduits 14 terminate. Inside some, one or all of the conduits 14 is one or more electrical cables 16. The conduits 14 are laid from the walls, for example wall 12, to a place and location distant from the work area 10 as needed and selected by the utility company or architect.

The conduits 14 terminate at the wall 12. However, the cables 16 in conduits 14 pass through the wall 12 and enter conduits 18 in a second wall 20. Typically, the cable 16 makes a 90 degree turn going from the first wall 12 to the second wall 20.

Typically, the walls of the work area 10 are made from poured concrete. Also, during the initial assembly or when additional conduits are being added (when the live electrical cables are kept in place), the conduits 14 and 18 are usually positioned in their desired configurations and then concrete is poured around the conduits 14 and 18 to keep the conduits 14 and 18 in their desired positions and orientations.

Typically, the conduits 14 and 18 are arranged in rows and columns with "x" conduits in a row and "y" rows in a bank. Often there are four rows of four conduits as shown in wall 12 of FIG. 1.

The invention comprises a modular, end-frame 22 for a plurality of conduits. The end-frame 22 comprises a first peripheral modular element 24 and either (a) a second peripheral modular element 26 or (b) at least one intermediate modular element or (c) a combination of both (a) and (b).

In the embodiments shown in FIG. 1, the elements are arranged horizontally with the first peripheral element 24 on the top and the second peripheral element 26 on the bottom. However, it is possible that the elements be arranged vertically rather than horizontally. Also shown in the embodiment of FIG. 1 are three intermediate elements 28A, 28B and 28C.

In some embodiments for limited applications, it is necessary to have only the first and second peripheral elements to form a single row of openings to terminate the conduit. In such applications it may be attempted to use a peripheral element and an intermediate element, or even two intermediate elements without any peripheral elements. Although these embodiments are not preferred they are intended to fall within the scope of the invention. Similarly, it is intended that any combination of modular element, including intermediate elements with no peripheral element, one peripheral element with one or more intermediate elements and two peripheral elements with no, one or more intermediate elements, all fall within the scope of the invention.

Figure 2:
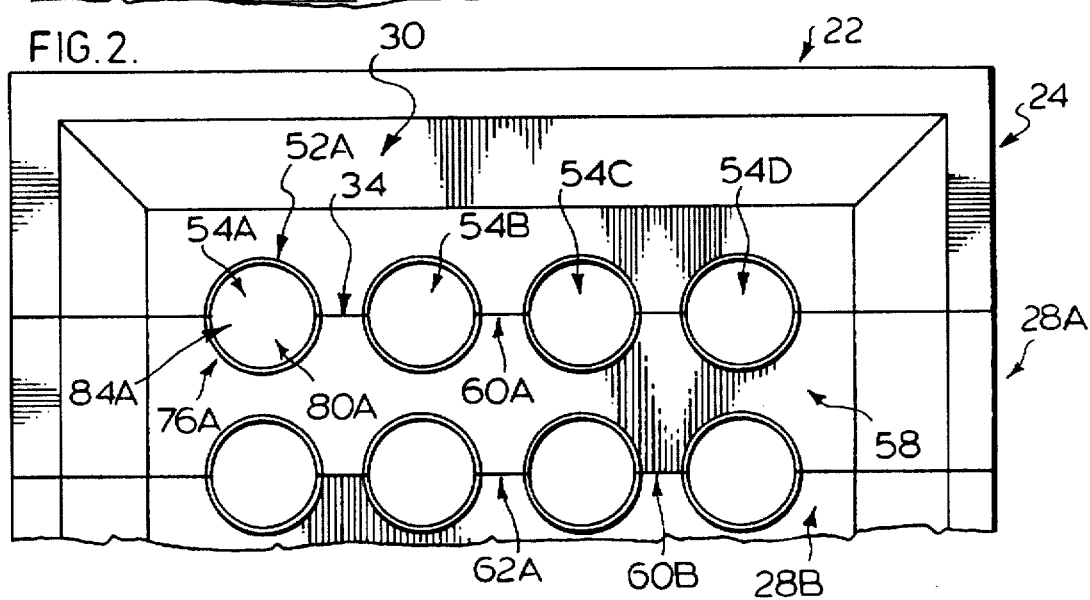
FIG. 2 is a partial front view of a end-frame of the invention.

A close-up view of peripheral element 24 and intermediate element 28A of end-frame 22 is shown in FIG. 2. FIG. 2 is a front view of a preferred embodiment the end-frame 22 looking from within the work space 10.

FIGS. 3 and 4 show for illustration purposes only a peripheral element 24 in a schematic perspective view from behind. Preferably, the peripheral element 24 shown in FIGS. 3 or 4 can be used for either the first or second peripheral elements 24 or 26, depending upon the orientation of the element.

Referring to FIG. 3, the peripheral modular element 24 comprises a substantially-rectangular, planar front face member 30. The front face member 30 has a first side edge 32 and a second side edge 34. The front face member 30 also has a first end edge 36 and a second end edge 38.

The front face member 30 has substantially no openings transversely through it except as described below. The reason for this is that the modular elements are intended to prevent the flow of concrete or other fill beyond the front face member 30 when concrete is poured around the ends of the conduit 14. Therefore, when it is said that a front face member 30 has substantially no openings transversely therethrough, it is intended to mean that there will be substantially no openings through which concrete or other fill will be able to flow transversely through the front face member. Thus, the end-frame is fill-flow-preventing.

During assembly concrete is poured in behind the end-frame 22 as viewed from within the work space 10 as shown in FIG. 1. Thus, the invention is intended to prevent any substantial amount of concrete from flowing from behind the end frame 22 into the front regions of the end frame 22.

Referring again to FIG. 3, there is a flange-like member 40 extending outwardly from the first side edge 32. Also, there is a flange-like member 42 extending outwardly from the first end edge 36 and flange-like member 44 extending outwardly from the second end edge 38. Preferably, in each instance, there is a connecting member 46, 48, 50 respectively connecting flange members 40, 42, 44 to the respective edges 32, 36, 38.

In the most preferred embodiment, the flange-like member 40 (as shown in FIG. 4) extends along the entire length of the side edge 32 and the connecting member 46 also runs the entire length of the first side edge 32. Preferably, the flange-like member 40 is integrally formed into the flange-like members 42 and 44.

In FIGS. 3 and 4, the flange-like members 40, 42 and 44 are positioned on a side of the face member 30 that is opposite to the side of the face member 30 from which semi-circular members 52 extend. Also, the flange-like members 40, 42, 44 are aligned preferably in a second plane P2 which is forward of and parallel to the first plane P1 of the front face member 30. The reasons for this configuration will be discussed in more detail below.

Although it is preferred that the flange-like members be aligned in a second plane, the flange-like members may extend directly from the front face member 30 and be aligned in the same plane P1 as the front face member 30 (as shown in FIG. 8).

In one embodiment (not shown), the flange-like members of the peripheral element extend only from the end edges 36 and 38 and not from the side edge. In such an embodiment, the width of the face member 30 may be increased in order to provide more area to prevent concrete from flowing into a front region of the end-frame 22.

As best seen in FIG. 2, there are transverse openings 54 through the front face member 30. Preferably, these transverse openings 54 are semi-circular. These transverse openings are spaced along the second side edge 34 of the front face member 30. Preferably, the transverse openings 54 are spaced equally along the second side edge 34.

As best seen in FIGS. 3 and 4, there are hollow, substantially semi-cylindrical members 52 conforming in shape to the semi-circular members 52 in the face member 30. Also, the semi-cylindrical members 52 extend rearwardly from the respective semi-circular opening 54 in the face member 30. The semi-circular members 54 extend transversely from the face member 30. The semi-cylindrical members 52 combine with other corresponding semi-cylindrical members to form cylindrical member which engage the conduit 14A, either by abutting against the end of the conduit as described below or by simply having the conduit rest in and on, and be supported by, the cylindrical members.

Although the cylindrical members engaged the conduit, the conduit itself is not part of this invention and the end-frame of this invention does not include conduit extending from the end-frame, except for the conduit that is engaged by the cylindrical member as described herein.

Figure 5:
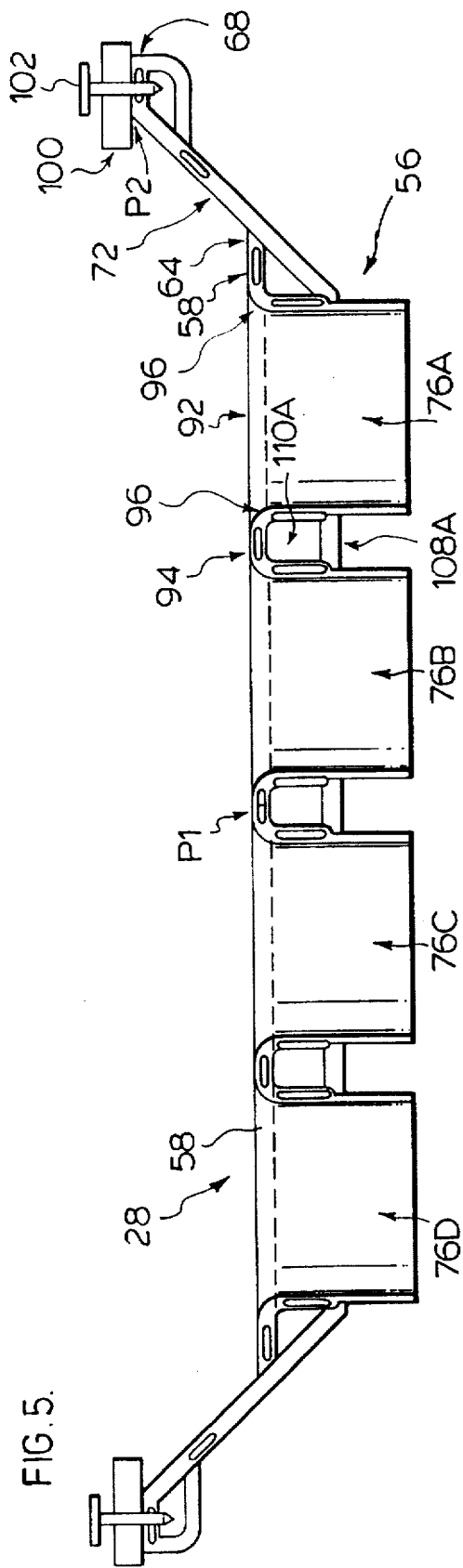
FIG. 5 is a top view of a preferred embodiment of an intermediate modular element.
Figure 6:
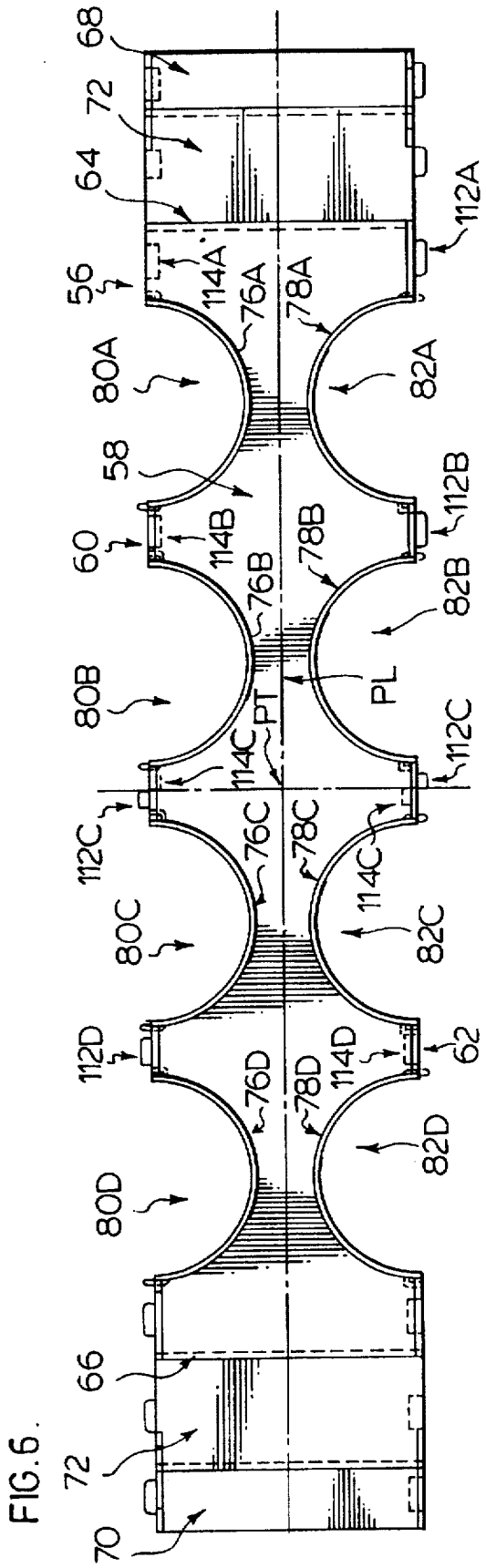
FIG. 6 is a back view of a preferred embodiment of an intermediate modular element.

Referring now to FIGS. 5 and 6, a preferred embodiment of an intermediate modular element 56 may be seen. The intermediate modular element 56 has a substantially-rectangular, planar face member 58. The face member 58 has a first side edge 60 and a second side edge 62. The face member 58 also has a first end edge 64 and a second edge 66.

Like the face member 30 of the peripheral element 24, the face member 58 of the intermediate element 56 has substantially no openings transversely therethrough except as described below.

The face member 58 has a flange-like member 68 extending outwardly from the first end edge 64 and a second flange-like member 70 extending outwardly from the second end edge 66. In the preferred embodiment shown in FIGS. 5 and 6, the first and second flange-like members 68, 70 are connected to the respective end edges 64, 66 by connecting members 72 and 74.

Preferably, the flange-like members 68, 70 are positioned on the side of the face member 58 opposite to that of the semi-circular members 76 and 78. Preferably, the flange-like members 68, 70 are aligned in a second plane P2 which is forward of and parallel to the first plane P1 in which the face member 58 is aligned.

There are substantially semi-circular, transverse openings 80 and 82 through the front face member 58. The semi-circular openings 80 are spaced along the first side edge 60 of the face member 58 and the semi-circular openings 82 are spaced along the second side edge 62 of the face member 58. Preferably, the respective semi-circular openings 80 and 82 are equally spaced along their respective side edges 60, 62.

Hollow, substantially semi-cylindrical members 76, 78 conform in shape to the semi-circular openings 80, 82 in the face member 58. Also, the semi-cylindrical members 76, 78 extend rearwardly from each of the semi-circular openings 80, 82 and extend transversely from the face member 58.

When the individual modular elements are assembled to form the conduit end-frame 22, the face members 30 and 58 (as shown in FIG. 2) are aligned in a single plane P1. The first side edge 60A of the first intermediate modular element 28A abuts against the second side edge 34 of the first peripheral element 24. Thus, when the two modular elements 24 and 28A are assembled, the two elements 24 and 28A are close enough to each other such that concrete will not flow between the two elements 24 and 28A when concrete is poured behind the end-frame 22.

Additional intermediate elements 28, such as elements 28B and 28C as shown in FIG. 1, may be included in the end-frame 22 depending on the number of conduits 14.

The invention has been shown with modular elements which form four openings per row. However, the invention can be made with any number of openings per row as desired. Similarly, any reasonable number of intermediate elements 28 may be included with the assembled end-frame to accommodate the total number and arrangement of conduits.

When more than one intermediate modular element 28A is used, the intermediate modular elements 28B and 28C (as shown in FIG. 1) are aligned adjacently one to the other such that the first side edge 60B of the next intermediate element 28B abuts against the second side edge 62A of the adjacent intermediate element 28A.

In a preferred embodiment, the end-frame 22 comprises a second peripheral modular element 26 (as shown in FIG. 1) which abuts against the last intermediate element 28C.

Pairs of opposed semi-cylindrical members of adjacent intermediate and/or peripheral elements, such as semi-cylindrical member 52A of the first peripheral element 24 and cylindrical element 76A of intermediate element 28A, form a cylindrical member such as cylindrical member 84A. The cylindrical members engage the conduit 14A, either by abutting against the end of the conduit as described below or by simply having the conduit rest in and on, and be supported by, the cylindrical members.

The cylindrical members so formed have inner diameters ID1 substantially the same as the inner diameter ID2 of conduit which ends at the cylindrical member of the end-frame, or slightly larger, depending on whether the conduit abuts against the cylindrical member or rests in and on it.

Thus, as shown in FIG. 7 (which is a partial cross-sectional view of cylindrical member 84A taken from the side), the inner diameter ID1 of the cylindrical member 84A is substantially the same as the inner diameter ID2 of the conduit 14A which abuts against the end of cylindrical member 84A. It is preferred that the conduit 14A does not fit into the cylindrical member 84A. The reason for this is that if the conduit 14A were to fit inside the cylindrical member 84A there would be a relatively sharp end 88 of the conduit which would be exposed so as to scrape and damage cables 16 which are inserted through the conduit 14 and exit through the end-frame 22. However, when the end 88 of the conduit 14A abuts against the end 86 of the cylindrical member 84A there is no edge which can cause damage to the cable.

The end 88 of the conduit 14A is held in place against the end 86 of the cylindrical member 84A by a cylindrical, push-fit connector 90.

In preferred embodiments of the invention, the semi-circular openings 54 (of the peripheral elements 24) and the semi-circular openings 80 and 82 (of the intermediate elements 28) each has an opening 92 into the frontal face 94 of the respective face member. As best seen in FIG. 5 (with respect to the intermediate member 28 but which is equally applicable to the peripheral member 24) it can be seen that each opening 92 into the frontal face 94 has a curvilinear edge portion 96. The purpose of the curvilinear edge portion 96 is to avoid sharp edges at the opening 92 which might damage the cables 16 as they emerge from the opening 92. In many instances, the cables 16 must make a 90 degree turn as soon as they emerge from the opening 92 and, therefore, would rub against a sharp edge if it existed and subject the cables to possible damage. With the curvilinear edges 96 there is less likelihood of any damage to the electrical cables 16.

An important feature of the invention is the flange-like member extending from the face members of the respective modular elements. During assembly of the end-frame 22 it is necessary to install a wooden frame 100 to support and steady the end-frame 22 when concrete is being poured around the conduits 16 and the rearward portion of the end-frame 22. The wooden frame 100 is built around the periphery of the end-frame and corresponds to where the flange-like members of the various elements are positioned. The various modular elements are connected to the wooden frame 100 (as shown in FIG. 5) by some sort of suitable connecting means such as nails or screws, as best seen in FIG. 5. A nail 102 is shown in FIG. 5 connecting the intermediate element 28 to the wooden frame 100. Preferably, at least one screw or nail will connect the modular element to the wooden frame at each flange-like member. For example, for the intermediate elements 28, a nail or screw will pass through each of flange-like members 68 and 70.

Similarly, for the peripheral elements 24, at least one nail or screw will pass through the flange-like member 40. If the flange-like member 40 extends along the entire length of the first side edge 32, there will likely be more than one screw or nail connecting the flange-like member 40 to the wooden frame 100.

If there are flange-like members 42, 44, a screw or nail will likely be used to connect the flange-like members 42, 44 to the wooden frame 100.

Thus, for each flange-like member of a modular element, there must be at least one portion through which a connecting means may readily be passed so as to secure the flange-like means, and therefore the modular element itself, to the wooden frame.

In a preferred embodiment, each modular element is integrally formed from a suitable plastic material. A preferred plastic material is one in which the screw or nail 102 may readily be passed through the flange-like member with reasonable and usual force with an appropriate hammer or screwdriver. A preferred plastic material is a acrylonitrilo-butadiene-styrene (ABS) material or a polyvinyl chloride (PVC) material.

The purpose of the flange-like members is to provide a place to connect the respective modular elements to the wooden frame 102 at a location which is safely removed from the openings 92 and the cylindrical members 84 where live electrical cables may be positioned. In the past, when prior art end-frames were being assembled, and particularly when additional conduits were being added to an existing end-frame, workers would nail or screw individual connectors at the individual openings 92. If the worker was not careful it was possible to drive nails or screw screws into live electrical cables thereby causing electrocution to the worker.

In the present invention, the flange-like members (where the securing means 102 is connected to the wooden frame 100) are sufficiently distanced from the openings 92 and circular members 84 of the end-frame 22 so as to significantly reduce the likelihood of a worker striking a live electrical cable 16 with the securing means 102.

As noted above, in one embodiment of the invention (as shown in FIG. 8), a flange-like member 104 extends in the same plane P1 as the plane P1 of the face member 30 or 58.

The flange-like members are positioned such that they are not rearward of the face member. Thus, the flange-like members may be in the same plane P1 as the plane of the face member, however the flange-like members are not positioned any further rearward than the face member.

Similarly, each flange-like member of each modular element is positioned parallel to or forward of a most forward opening in the face member of the respective modular element. Thus, for example, referring to FIG. 8, the flange-like member 104 is parallel to the most forward opening 92 in the face member 30, 58 of the modular element.

As shown in FIG. 9, the flange-like member 106 is forward of a most forward opening 92 in the face member 30, 58 of the respective modular element.

In another more preferred embodiment of the invention (as shown in FIG. 9), the flange-like member 106 is in a second plane P2 which is forward of and parallel to the first plane P1 of the front face member 30 or 58. The reason for having the flange-like member in a different plane than the plane P1 of the front face member is to reduce the likelihood that the connecting means 102 will strike a live cable.

In a preferred embodiment, as shown in FIG. 5, the connecting member 72 connecting the flange-like member 68 in the second plane to the front face member 58 is positioned at an obtuse angle with respect to the front face member 58. Preferably the connecting member 72 is positioned at an angle in the range from about 125 degrees to 145 degrees, and most preferably 135 degrees, with respect to the front face member 58. Although this embodiment has been described with respect to an intermediate modular element as shown in FIG. 5, the description of the embodiment applies equally as well to peripheral elements such as peripheral element 24 or 26.

As shown in FIG. 8, because an electrical cable 16 is relatively stiff, it has a radius of curvature that is greater than the radius of the curvilinear portion 96 of the opening 92. Thus, there is a tendency for the electrical cable 16 to sway out from the wall 12 when the flange-like member 104 is in the same plane P1 as the front faces 30 or 58. In contrast, when the flange-like member 106 is positioned in a plane P2 forward of and parallel to the first plane P1 of the face member 30 or 58 the radius of curvature of the electric cable 16 can be taken into account so that the cable 16 can lie flat against the wall 12 and not sway outwardly from the wall 12.

In order to better stabilize the end-frame 22 after the concrete has been poured and the wooden frame 100 has been removed, it is preferred that the modular elements 24 and 28 have fill retaining means (such as member 108A in FIG. 5). The fill retaining member 108A forms a fill retaining cavity 110A such that when concrete is poured on the rearward side of the end frame 22, concrete will flow into the fill retaining cavity 110A and assist in stabilizing the end-frame 22 after the wooden frame 100 has been removed. Throughout this description, references have been made to concrete being used to fill-in around the conduit 14. However, any form of suitable fill such as sand could be used for this purpose. Thus, the reference to concrete is for descriptive purposes only.

Figure 10:
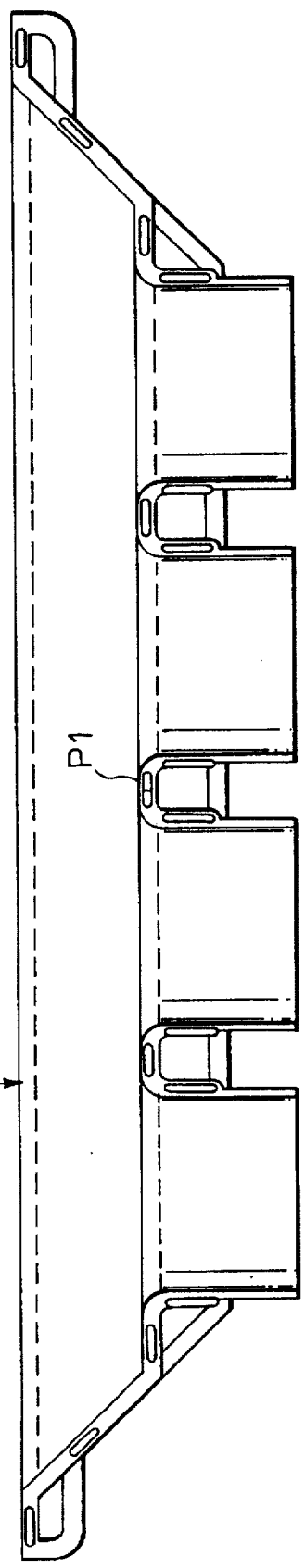
FIG. 10 is a top view of a preferred embodiment of a modular peripheral element.
Figure 11:
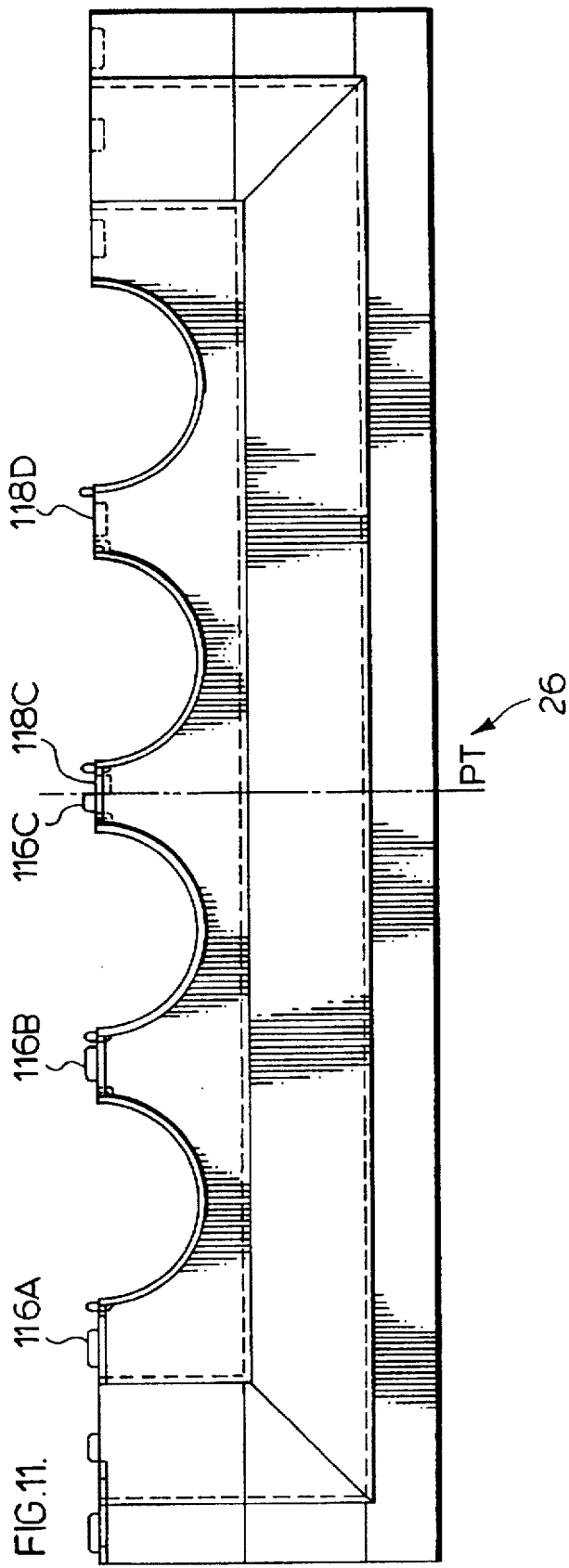
FIG. 11 is a back view of a preferred embodiment of a modular peripheral element.

In order to assist in stabilizing the end-frame 22 and the various modular elements before, during and after concrete is poured, a combination of pins 112 (as best seen in FIG. 6) and holes 114 are integrally formed in the side edges 60 and 62 of the element 56. Although this embodiment is specifically described with respect to the intermediate element 56, the embodiment applies equally as well to peripheral elements, such as element 24 as shown in FIGS. 10 and 11.

In a preferred embodiment of the invention, each intermediate element (as best seen in FIG. 6 with respect to intermediate element 56), with the exception of the pins 112 and holes 114 thereof, is symmetrical about a central, longitudinal plane PL transverse to the first plane P1. The pins 112 and the holes 114 are reverse symmetrical about the central, longitudinal plane PL. By reverse symmetrical is meant that where there is a pin or hole, for example pin 112A, along a side edge, there is a corresponding hole or pin, for example hole 114A, in the corresponding position on the opposite side of the central longitudinal plane PL.

Also, as shown in FIG. 6, the intermediate element 56 is symmetrical, with the exception of the pins 112 and holes 114 thereof, about a central, transverse plane PT transverse to the first plane P1. The pins 112 and holes 114 are reverse symmetrical about the central transverse plane PT. Thus, for example, as shown in FIG. 6, pin 112C corresponds to hole 114C, and pin 112D corresponds to hole 114B.

The advantage of this symmetry and reverse symmetry is that two adjacent intermediate elements such as elements 28A and 28B can be secured adjacent to each other, but one mold can be used to form all of the intermediate elements.

Similarly, as shown in FIG. 11, the peripheral element 26 (or 24), with the exception of the pins and holes, is symmetric about a central, transverse plane PT transverse to the first plane P1. The pins 116 and the holes 118 of the peripheral element 26 are reverse symmetrical about the central transverse plane PT as shown in FIG. 11. Thus, for example, pin 116C on one side of the central, transverse plane PT has a corresponding hole 118C a corresponding distance from the central, transverse plane PT.

Although this disclosure has described and illustrated certain preferred embodiments of the invention, it is to be understood that the invention is not restricted to these particular embodiments. Rather, the invention includes all embodiments which are functional or mechanical equivalents and variants of the specific embodiments and features that have been described and illustrated herein.

I claim:

1. A modular, fill-flow-preventing, conduit-engaging end-frame, without conduit extending therefrom except for conduit that engages the end-frame as defined herein, comprising:

(a) a first peripheral modular element comprising:
   a substantially-rectangular, planar face member having first and second side edges and first and second end edges and having substantially no openings transversely therethrough except as defined below;
   at least one flange-like member extending outwardly from the first side edge of the face member and/or from each of the end edges of the face member, and wherein the flange-like member is not rearward of the face member;
   a plurality of substantially semi-circular, transverse openings through the face member and spaced along the second side edge of the face member; and
   a hollow, substantially semi-cylindrical member conforming in shape to and extending rearwardly from each semi-circular opening in the face member, and wherein each semi-circular member extends transversely from the face member; and (b) at least one intermediate modular element, wherein each intermediate modular element comprises:
   a substantially-rectangular, planar face member having first and second side edges and first and second end edges and having substantially no openings transversely therethrough except as defined below;
   a flange-like member extending outwardly from each of the first and second end edges of the face member of the intermediate modular element;
   a plurality of substantially semi-circular, transverse openings through the face member of the intermediate modular element and spaced along the first side edge of the face member of the intermediate modular element;
   a plurality of substantially semi-circular, transverse openings through the face member of the intermediate modular element and spaced along the second side edge of the face member of the intermediate modular element;
   a hollow, substantially semi-cylindrical member conforming in shape to and extending rearwardly from each semi-circular opening in the face member of the intermediate modular element, and wherein each semicircular member extends transversely from the face member of the intermediate modular element; and (c) a plurality of cylindrical, conduit-engaging members for engaging conduit, each having a conduit-sized inner diameter and each formed by a pair of opposed semi-cylindrical members of adjacent modular elements;
   wherein the face member of each modular element is aligned in a first plane;
   wherein the first side edge of a first of the at least one intermediate modular elements abuts against the second side edge of the first peripheral modular element;
   wherein each of the intermediate modular elements is aligned adjacently one to another such that the first side edge of a next intermediate modular element abuts against the second side edge of an adjacent intermediate modular element;
   wherein at least one of the flange-like members of each modular element has at least one portion through which a securing means may readily be passed; and
   wherein each flange-like member of each modular element is positioned parallel to or forward of a most forward opening in the face member of the respective modular element.

2. An end-frame as defined in claim 1 further comprising a second peripheral modular element, wherein the second peripheral element comprises:

11 a substantially-rectangular, fill-flow-prevention planar face member having first and second side edges and first and second end edges and having substantially no openings transversely therethrough except as defined below;

at least one flange-like member extending outwardly from the second side edge of the face member of the second peripheral modular element and/or from each of the end edges of the face member of the second peripheral modular element and wherein the flange-like member has at least one portion through which a securing means may readily be passed;

a plurality of substantially semi-circular, transverse openings through the face member of the second peripheral modular element and spaced along the first side edge of the face member of the second peripheral modular element;

a hollow, substantially semi-cylindrical member conforming in shape to and extending rearwardly from each semi-circular opening in the face member of the second peripheral modular element, and wherein each semi-circular member extends transversely from the face member of the second peripheral modular element; and wherein the face member of the second peripheral modular element is aligned in substantially the same plane as are the face members of other modular elements.

3. An end-frame as defined in claim 2 wherein each flange-like member is positioned on a side of the face member opposite to that from which the semi-cylindrical members of that element extend, and each flange-like member is aligned in a second plane which is forward of and parallel to the first plane.

4. An end-frame as defined in claim 3 wherein each flange-like member is connected to the face member of the modular element to which it is connected by a connecting member positioned at an obtuse angle with respect to the face member of the modular element to which it is connected.

5. An end-frame as defined in claim 4 wherein each semi-circular opening in the modular elements has an opening into a frontal face of the respective face member and each opening into the frontal face has a curvilinear edge portion.

6. An end-frame as defined in claim 5 wherein each modular element has a fill retaining member positioned between at least one pair of adjacent semi-cylindrical members to form a fill retaining cavity.

7. An end-frame as defined in claim 6 wherein each modular element is integrally formed from a plastic material.

8. An end-frame as defined in claim 7 wherein each modular element which is adjacent to any other modular element is secured to the any other modular element with a combination of pins and holes integrally formed in the side edge of the face member of the each modular element which is adjacent to the any other modular element and in the side edge of the face member of the any other modular element which is adjacent to the each modular element.

9. An end-frame as defined in claim 8 wherein each intermediate modular element, with the exception of the pins and holes thereof, is symmetrical about a central, longitudinal plane transverse to the first plane, and the pins and the holes are reversed symmetrical about the central longitudinal plane transverse to the first plane; and wherein each intermediate modular element and each peripheral element, with the exception of the pins and holes thereof, is symmetrical about a central, transverse plane transverse to the first plane and the pins and holes thereof are reverse symmetrical about the central transverse plane transverse to the first plane.

12

10. An end-frame as defined in claim 9 wherein each respective connecting member is positioned at an angle in the range of from about 125 degrees to about 145 degrees with respect to the face member of the modular element to which it is connected.

11. A fill-flow-preventing conduit-engaging end-frame peripheral element, without conduit extending therefrom except for conduit that engages the element, comprising:

a substantially-rectangular, planar face member having first and second side edges and first and second end edges and having substantially no openings transversely therethrough except as defined below;

at least one flange-like member extending outwardly from the first side edge of the face member and/or the end edges;

a plurality of substantially semi-circular, transverse openings through the face member and spaced along the second side edge of the face member; and a hollow, substantially semi-cylindrical member conforming in shape to and extending rearwardly from each semi-circular opening in the face member, and wherein each semi-circular member extends transversely from the face member;

wherein each flange-like member has at least one portion through which a securing means may readily be passed;

wherein a frontal face of the face member is aligned in a first plane and each flange-like member is aligned in a second plane which is forward of and parallel to the first plane; and wherein each flange-like member is positioned forward of a most forward opening in the face member.

12. A peripheral element as defined in claim 11 wherein the flange-like member is connected to the face member of the respective modular element by a connecting member positioned at an obtuse angle with respect to the front face member.

13. A peripheral element as defined in claim 12 wherein each semi-circular opening has an opening into a frontal face of a face member and each opening into the frontal face has a curvilinear edge portion.

14. A peripheral element as defined in claim 13 wherein a fill retaining member is positioned between at least one pair of adjacent semi-cylindrical members to form a fill retaining cavity.

15. A peripheral element as defined in claim 14 which is integrally formed from a plastic material and which is symmetrical about a central, transverse plane transverse to the first plane.

16. A peripheral element as defined in claim 15 having a combination of pins and holes integrally formed in the second side edge of the face member for securing the peripheral element to another corresponding peripheral element or to a corresponding end-frame intermediate element; and wherein the pins and holes are reverse symmetrically arranged about the central, transverse plane transverse to the first plane.

17. A peripheral element as defined in claim 16 wherein each respective connecting member is positioned at an angle in the range of from about 125 degrees to about 145 degrees with respect to the front face member.

18. A peripheral element as defined in claim 17 wherein each semi-cylindrical member has a conduit-sized inner diameter.

19. A fill-flow-preventing conduit-engaging end-frame intermediate element, without conduit extending therefrom except for conduit that engages the element, comprising:

a substantially-rectangular, planar face member having first and second side edges and first and second end edges and having substantially no openings transversely therethrough except as defined below;

a plurality of substantially semi-circular, transverse openings through the face member and spaced along the first side edge of the face member;

a plurality of substantially semi-circular, transverse openings through the face member and spaced along the second side edge of the face member; and a hollow, substantially semi-cylindrical member conforming in shape to and extending rearwardly from each semi-circular opening in the face member, and wherein each semi-circular member extends transversely from the face member;

a flange-like member extending outwardly from each of the first and second end edges of the face member;

wherein each flange-like member has at least one portion through which a securing means may readily be passed; and wherein the face member is aligned in a first plane and each flange-like member is aligned in a second plane which is forward of and parallel to the first plane; and wherein each flange-like member is positioned forward of a most forward opening in the face member.

20. An intermediate element as defined in claim 19 wherein each flange-like member is connected to the face member by a connecting member positioned at an obtuse angle with respect to the face member.

21. An intermediate element as defined in claim 20 wherein each semi-circular opening has an opening into a frontal face of the face member and each opening into the frontal face has a curvilinear edge portion.

22. An intermediate element as defined in claim 21 wherein a fill retaining member is positioned between at least one pair of adjacent semi-cylindrical members to form a fill retaining cavity.

23. An intermediate element as defined in claim 22 which is integrally formed from a plastic material and which is symmetrical about a central, transverse plane transverse to the first plane and symmetrical about a central, longitudinal plane transverse to the first plane.

24. An intermediate element as defined in claim 23 having a combination of pins and holes integrally formed in the first and second side edges of the face member for securing the intermediate element to any of another corresponding intermediate element and a corresponding end-frame peripheral element, wherein the pins and holes are arranged reverse symmetrically about the central longitudinal plane transverse to the first plane and reverse symmetrically about the central transverse plane transverse to the first plane.

25. An intermediate element as defined in claim 24 wherein each respective connecting member is positioned at an angle in the range of from about 125 degrees to about 145 degrees with respect to the front face member.

26. An intermediate element as defined in claim 25 wherein each semi-cylindrical member has a conduit-sized inner diameter.

* * * * *